H. C. STRUCHEN.
EMERGENCY TIRE.
APPLICATION FILED APR. 15, 1916.
1,248,947.
Patented Dec. 4, 1917.
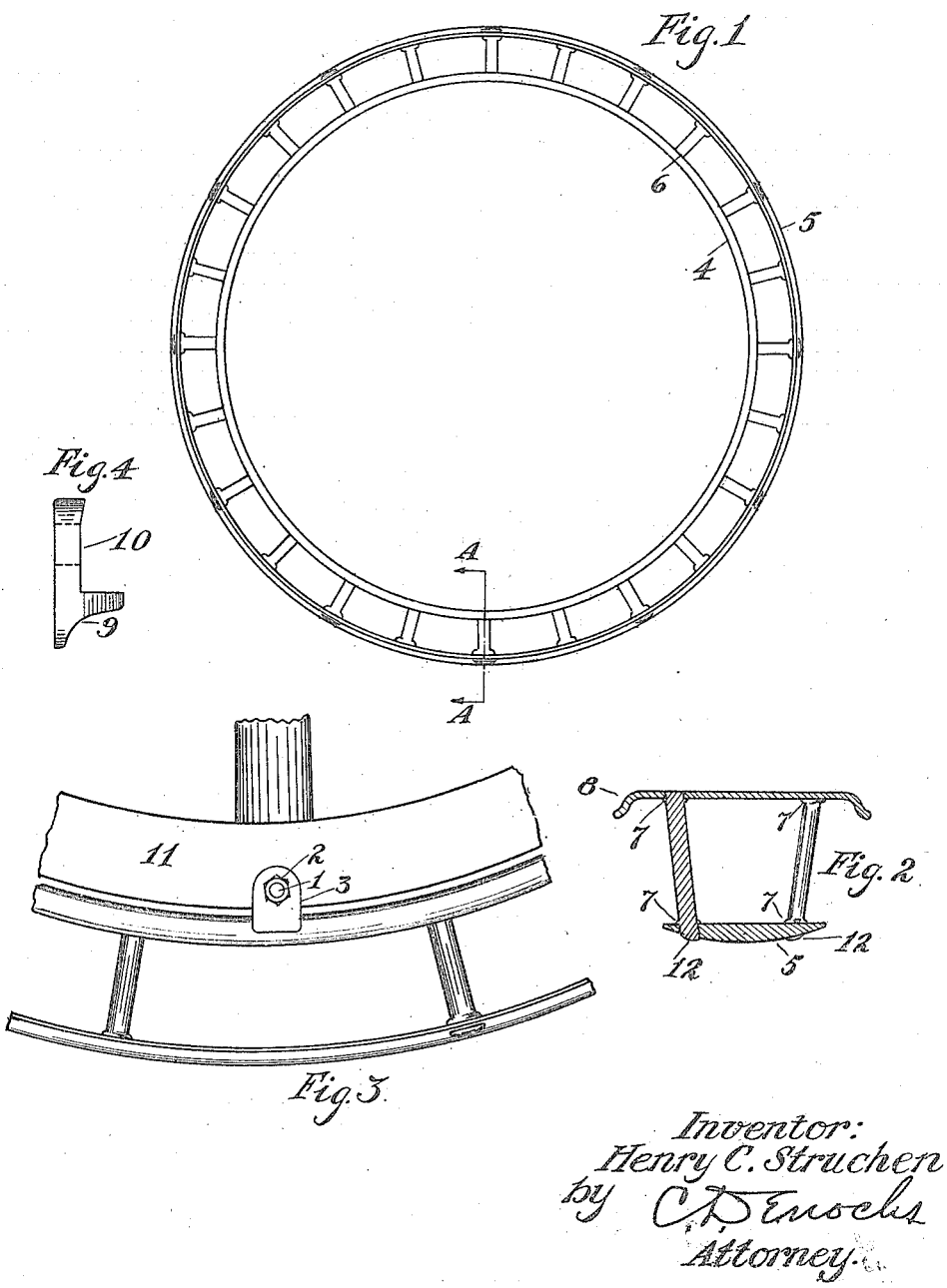

UNITED STATES PATENT OFFICE.

HENRY C. STRUCHEN, OF ST. PAUL, MINNESOTA.

EMERGENCY-TIRE.

1,248,947. Specification of Letters Patent. Patented Dec. 4, 1917.

Application filed April 15, 1916. Serial No. 91,440.

*To all whom it may concern:*

Be it known that I, HENRY C. STRUCHEN, a citizen of the United States, residing at St. Paul, in the county of Ramsey and State of Minnesota, have invented certain new and useful Improvements in Emergency-Tires, of which the following is a specification.

One object of my invention is to provide an emergency tire that can be readily and quickly put on the wheels in common use with demountable rims.

Another object of my invention is to provide a tire for automobiles or other vehicles that will take the place of the ordinary pneumatic tire ordinarily used, giving the same diameter of wheel when completed and be absolutely puncture-proof.

With these and incidental objects in view the invention consists of certain novel features of construction and combination of parts, the essential elements of which are hereinafter described with reference to the drawing which accompanies and forms a part of this specification.

In the drawings Figure 1 is a side elevation of my improved emergency tire. Fig. 2 is a section taken on the line "A A", Fig. 1. Fig. 3 is an enlarged view of a section of my tire applied to a wheel, shown in part only, and Fig. 4 is a view of the lug shown in Fig. 3 to hold the rim in place on the wheel.

A common type of automobile wheel has a series of bolts, such as 1, Fig. 3, on which may be attached by the nuts 2 the lugs 3, which serve to tighten and hold in place a demountable rim carrying a pneumatic tire.

My improved tire, as shown in Fig. 1, is comprised of an inner band of steel 4, a section being shown in Fig. 2, and an outer band 5 fastened together by short spokes 6, which are riveted into the bands 4 and 5, and have shoulders swedged up on the spokes, as shown at 7, Fig. 2.

The inner band 4, Fig. 2, is shaped so as to receive at 8 the surface 9 of the lug 10, Fig. 4, and when this inner band is placed over the wheel 11, Fig. 3, the lugs put in place and brought up by the nuts 2, the band will be tight and will be supported by the lugs 10 of which there would preferably be six.

The outer band 5, Fig. 2, is preferably rounded on its outer surface so as to give a better track to the vehicle, and the rivet heads 12 prevent skidding or slipping of the wheel.

It is apparent that with a tire of this nature carried as an emergency tire on the ordinary automobile, the outer diameter of the tire being the same as that of the pneumatic tire which it is to replace, should an accident, such as a puncture, or a blow-out occur, the rim and pneumatic tire may be quickly removed from the wheel and this emergency tire replaced and the automobile driven to the nearest repair station, or until the trip is finished, without any possibility of another accident to that particular wheel.

Without an emergency wheel of this sort, it is necessary to carry one or more extra tires, which makes an added expense, or in case of an accident to drive the car to a repair station on the flat tire, or remove the tire and drive on the rim, either practice being destructive, one to the casing and inner tube, and the other to the rim itself. Moreover, in driving on the rim without a tire, that wheel is of course of much smaller diameter than the corresponding one on the other side and the steering is difficult and dangerous.

While I have described my invention and illustrated it in one particular design, I do not wish it understood that I limit myself to this construction, as it is evident that the application of my invention may be varied in many ways within the scope of the following claims.

Claims:

1. In an emergency tire the combination of an inner band and an outer band, multiple spokes spacing said bands apart concentrically, shoulders at either end of said spokes between said bands, the ends of said spokes extending into said inner band being riveted practically flush with the inner surface thereof, and the ends of said spokes extending through said outer band being riveted so as to form a head extending outwardly from said outer rim.

2. In an emergency tire, the combination of an inner band and an outer band, multiple spokes spacing said bands apart concentrically, said inner band having a flange thereon adapted to fit on to an automobile wheel, and said outer band having a cross section, the outer boundary of which is convex.

HENRY C. STRUCHEN.